No. 844,374. PATENTED FEB. 19, 1907.
J. O. LINDEN.
FERTILIZER SPREADER.
APPLICATION FILED JUNE 12, 1906.
8 SHEETS—SHEET 3.
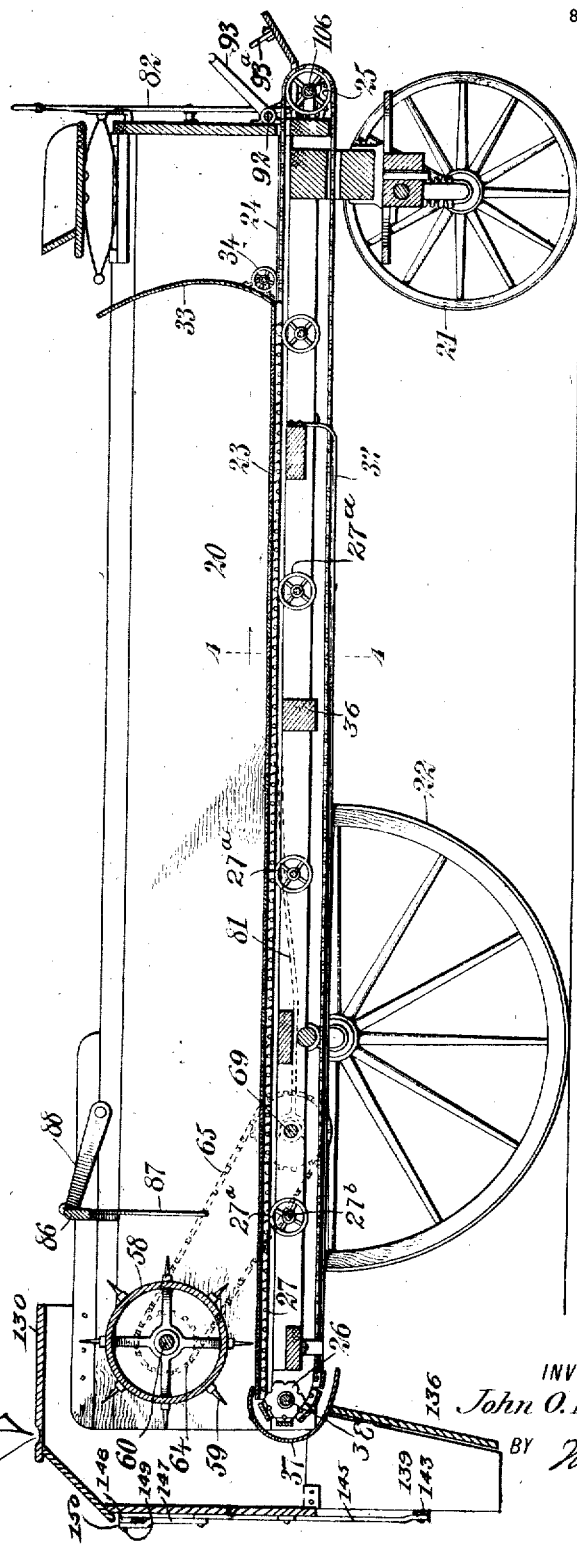
WITNESSES:
INVENTOR
John O. Linden
BY
ATTORNEYS

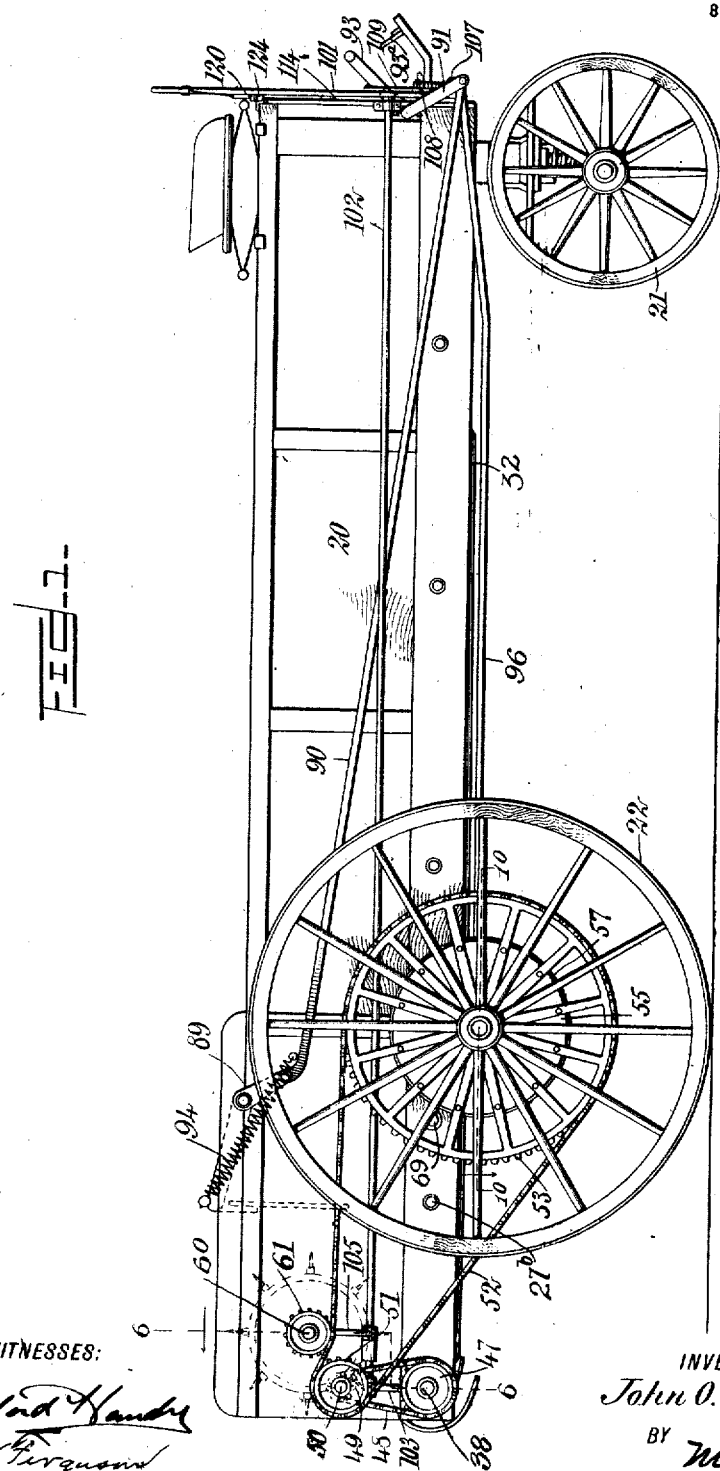

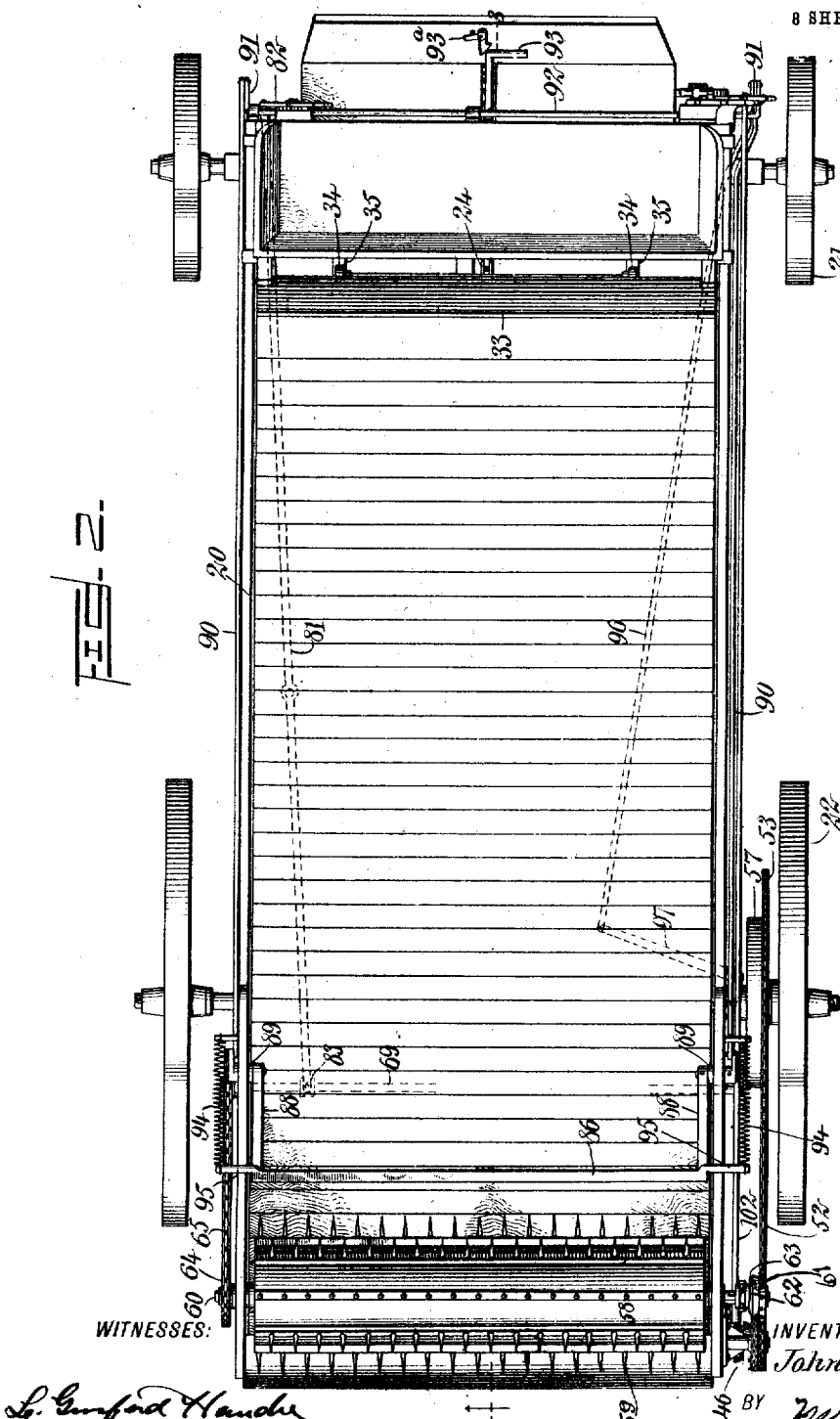

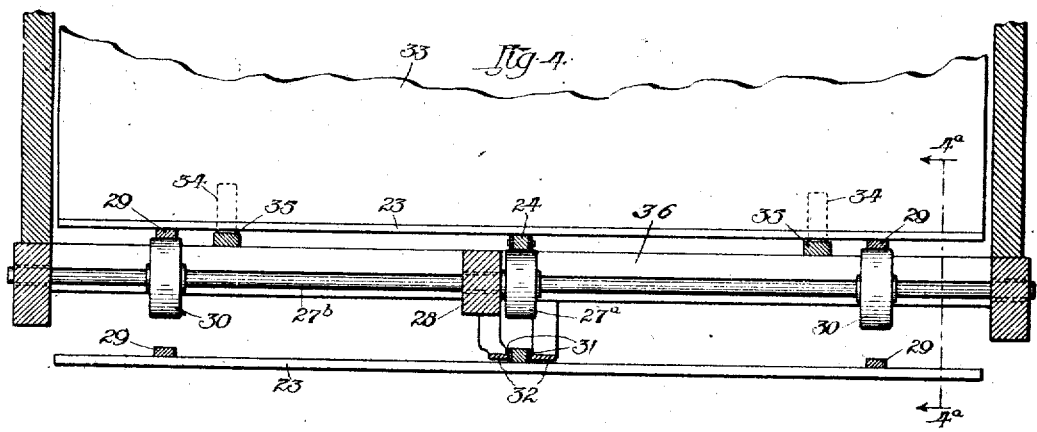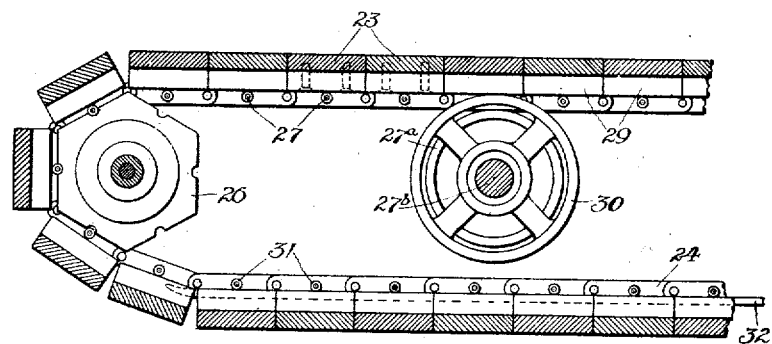

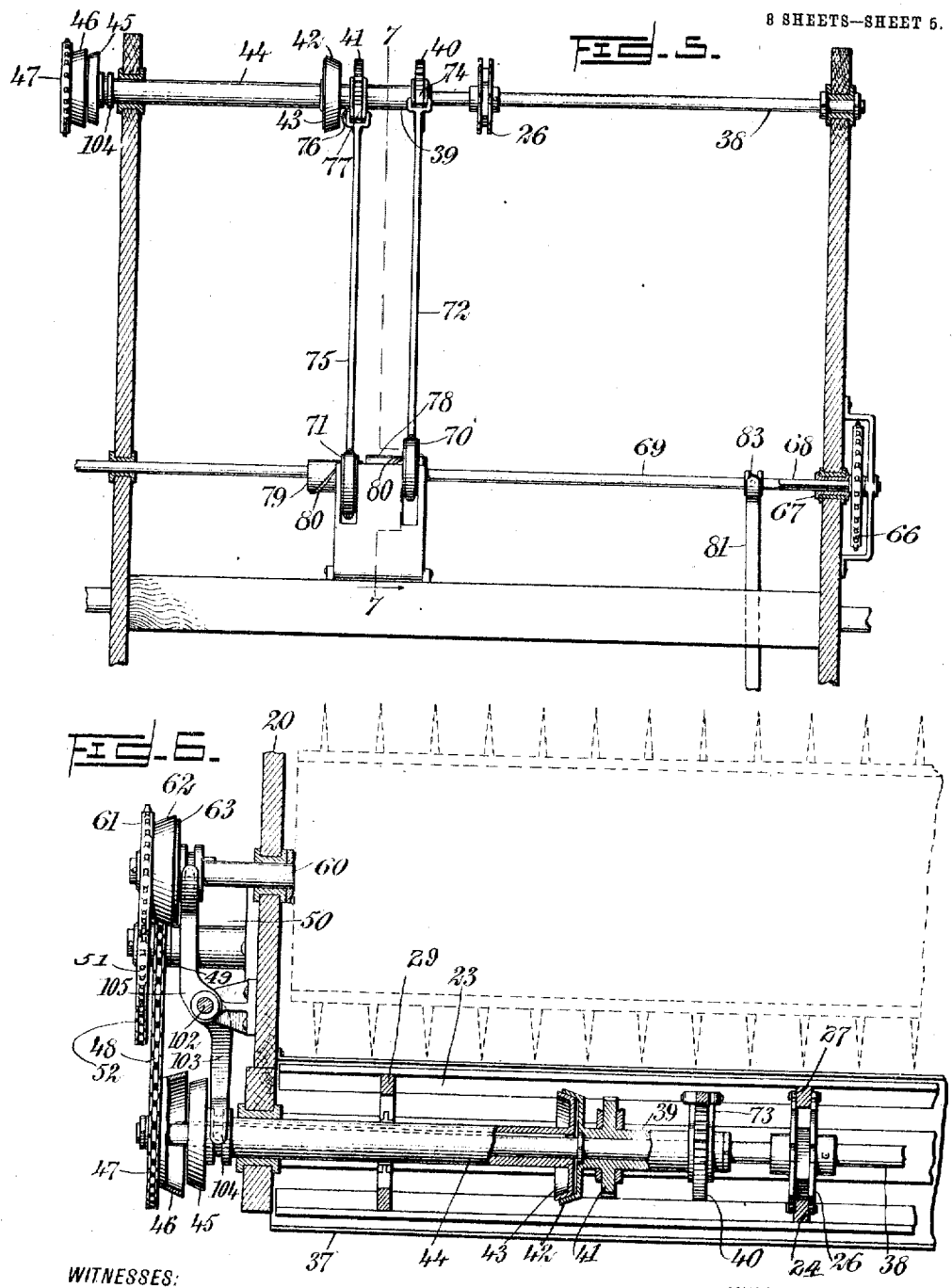

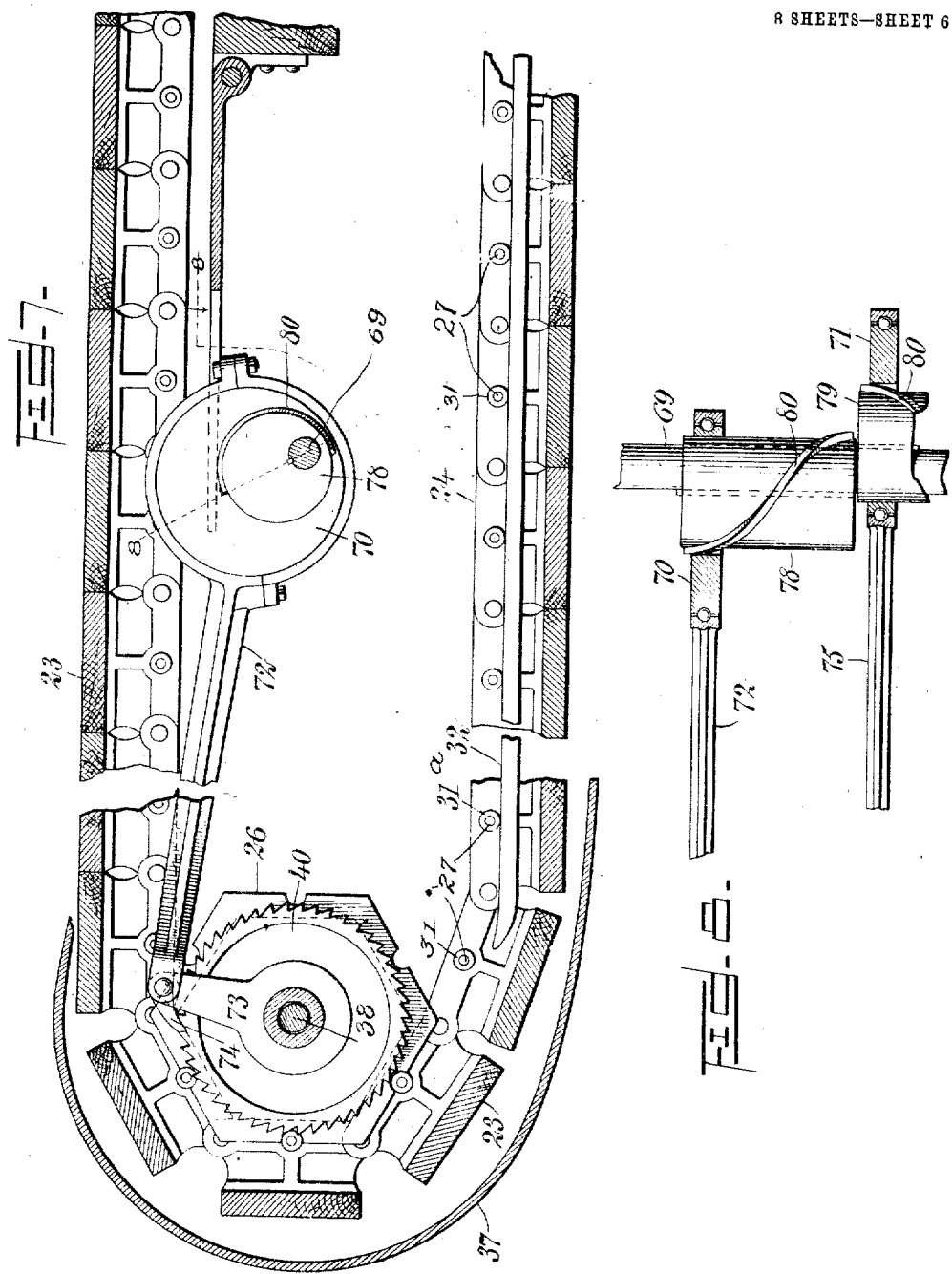

No. 844,374. PATENTED FEB. 19, 1907.
J. O. LINDEN.
FERTILIZER SPREADER.
APPLICATION FILED JUNE 12, 1905.
8 SHEETS—SHEET 7.
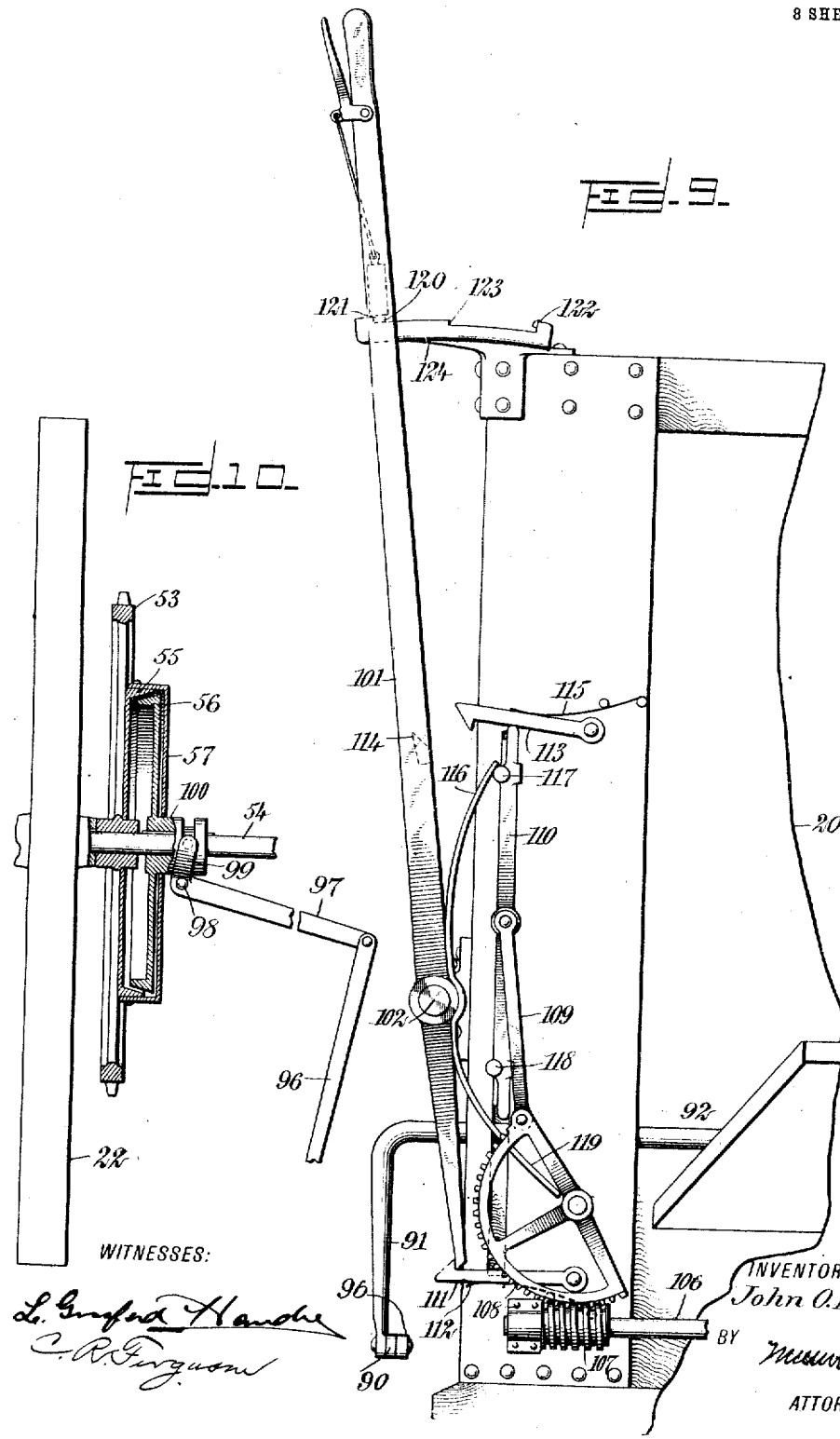
WITNESSES:
INVENTOR
John O. Linden
BY
ATTORNEYS No. 844,374. PATENTED FEB. 19, 1907.
J. O. LINDEN.
FERTILIZER SPREADER.
APPLICATION FILED JUNE 12, 1905.
8 SHEETS—SHEET 8.
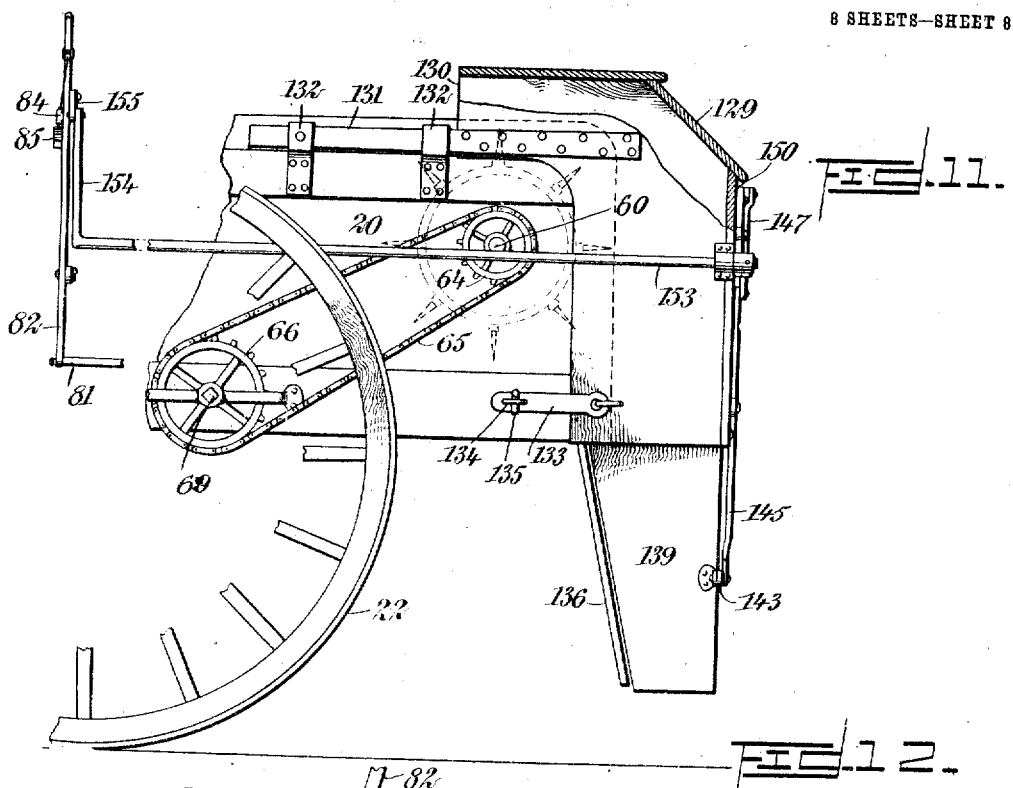
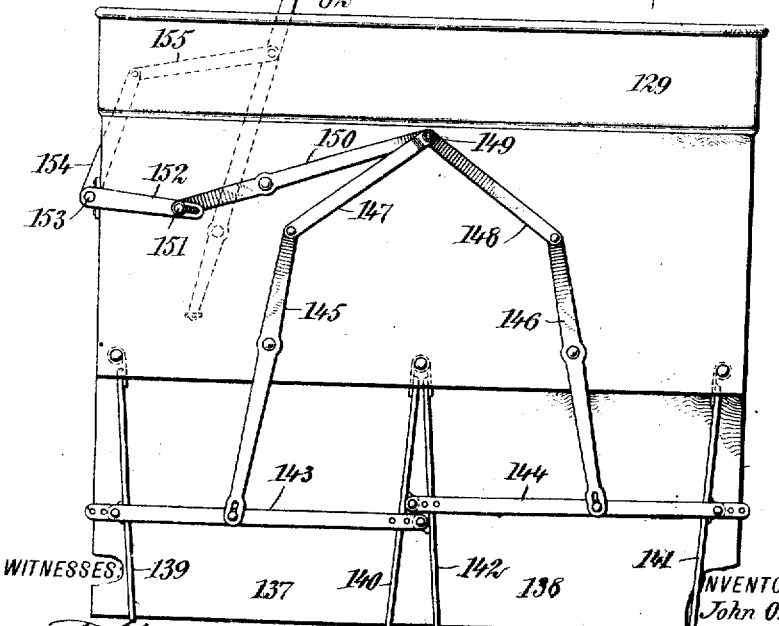
WITNESSES
INVENTOR
John O. Linden
BY
ATTORNEYS

UNITED STATES PATENT OFFICE.

JOHN O. LINDEN, OF PROPHETSTOWN, ILLINOIS, ASSIGNOR TO INTERNATIONAL HARVESTER COMPANY, A CORPORATION OF NEW JERSEY.

FERTILIZER-SPREADER.

No. 844,374.　　　　　Specification of Letters Patent.　　　　　Patented Feb. 19, 1907.

Application filed June 12, 1905. Serial No. 264,862.

*To all whom it may concern:*

Be it known that I, JOHN O. LINDEN, a citizen of the United States, and a resident of Prophetstown, in the county of Whiteside and State of Illinois, have invented a new and Improved Fertilizer-Spreader, of which the following is a full, clear, and exact description.

This invention relates to improvements in machines for spreading fertilizer—such, for instance, as manure—an object being to provide a device for this purpose so constructed as to regulate the thickness of the fertilizer that the soil may require, the regulation being under control from the driver's seat.

A further object is to provide, in connection with the machine, a device for controlling different widths of rows, such device being also under control of the driver, and, further, to provide a means that may be thrown in and out of gear by the driver for breaking up the fertilizer, so that it cannot be thrown out in chunks.

Other objects of the invention will appear in the general description.

Figure 1 is a side elevation of a fertilizer-spreader embodying my invention. Fig. 2 is a plan thereof. Fig. 3 is a section on the line 3 3 of Fig. 2. Fig. 4 is a section on the line 4 4 of Fig. 3. Fig. 4ª is a view showing a portion of Fig. 4, but drawn on a larger scale. Fig. 5 is a detail plan showing an apron-actuated mechanism. Fig. 6 is a section on the line 6 6 of Fig. 1. Fig. 7 is a section on the line 7 7 of Fig. 5. Fig. 8 is a section on the line 8 8 of Fig. 7. Fig. 9 is a front elevation showing the mechanism for throwing the working parts in and out of gear. Fig. 10 is a section on the line 10 10 of Fig. 1. Fig. 11 is a side elevation, partly in section, showing a drill-regulating attachment; and Fig. 12 is an end view therof.

The machine comprises a box-like body 20, mounted on front wheels 21 and rear wheels 22. Arranged to move back and forth along the lower portion of the body 20, and practically forming the bottom thereof, is an apron, consisting of slats 23, mounted at the center on an endless chain 24. It will be noted, however, that the slats 23 extend along a portion only of said chain and that when moved horizontally along the body the edges of the slats will be close together, thus practically forming a closed bottom for the body. The chain 24 at the forward portion passes around a sprocket-wheel 25 and at the rear end passes around a sprocket-wheel 26, through the medium of which motion is imparted to the apron. As shown in Fig. 6, this sprocket-wheel 26 is made double or in two sections spaced apart and provided with peripheral notches to receive rollers 31 on pins 27 on the links of the chain, over which the slats 23 are placed. The upper stretch of the endless chain is supported on rollers 27ª, mounted on shafts 27ᵇ, having bearings in a longitudinal beam 28 and also in the side rails of the body, and the outer ends of the slats are provided with track portions 29, which engage with rollers 30 on the shafts of the rollers 27ª. The portion of the chain passing underneath the body is supported by rollers 31, engaging with tracks 32, arranged underneath the body.

At the inner end of the apron portion is an upwardly-extended abutment 33, at the lower portion of which are rollers 34, which engage with tracks 35, supported on crossbars 36. At the rear end of the body and curved around the outer end of the apron is a guard-plate 37 to prevent the entrance of cornstalks, straw, or the like between the edges of the slats 23 as they pass over the sprocket-wheel 26. The said sprocket-wheel 26 is rigidly mounted on a shaft 38, and loosely mounted on this shaft 38 is a sleeve 39, carrying two ratchet-wheels 40 41, and also on this sleeve is a friction-clutch member 42, designed to be engaged with a friction-clutch member 43, attached to a sleeve 44, movable longitudinally on the shaft 38, but adapted to rotate therewith, as it is connected to said shaft by means of a spline.

On the outer end of the sleeve 44 is a friction-clutch member 45, designed to be placed into engagement with a clutch member 46, loosely mounted on the shaft 38, and connected to this clutch member 46, and consequently loosely mounted on the shaft, is a sprocket-wheel 47, from which a chain 48 extends to a connection with a sprocket-pinion 49 on a stud 50, and attached to this pinion is a sprocket-wheel 51, from which a chain 52 extends to a sprocket-wheel 53, loosely mounted on the axle 54 of the rear wheels. Attached to the sprocket-wheel 53 is a friction-clutch member 55, designed to be engaged by a clutch member 56, movable longitudinally on the axle or shaft 54, but adapted to rotate therewith. These two clutch members are inclosed by a casing 57, attached to the sprocket-wheel 53, as clearly shown in Fig. 10.

Arranged in the rear portion of the body over the apron is a device for breaking up chunks of fertilizer. This breaker consists of a cylinder 58, having projecting teeth 59. This cylinder is mounted on a shaft 60, having bearings in the side boards of the body, and loosely mounted on this shaft 60 is a sprocket-wheel 61, which is engaged at the under side by the chain 52, so that when the apron is operating to discharge fertilizer the cylinder or breaker will rotate in the opposite direction to the movement of the apron.

Connected to the sprocket-wheel 61 is a friction-clutch member 62, designed to be engaged by a clutch member 63, movable longitudinally of the shaft 60, but designed to rotate therewith. On the end of the shaft 60, opposite to that of the clutch members, is a sprocket-wheel 64, from which a chain 65 extends to a connection with a sprocket-wheel 66, designed to impart motion in one direction or in discharging direction to the apron. The means for imparting this motion I will now describe.

The sprocket-wheel 66 is attached to a sleeve 67, having an angular opening through which the angular portion 68 of an apron-driving shaft 69 is longitudinally movable. On this shaft 69 are eccentrics 70 71. From the strap of the eccentric 70 an eccentric-rod 72 extends rearward and has pivotal connection with an arm 73, mounted to swing on the sleeve 39, and carried by this arm is a pawl 74 for engaging with the ratchet-wheel 40. From the strap of the eccentric 71 a rod 75 extends rearward and has pivotal connection with an arm or arms 76, mounted to swing on the sleeve 39, carrying a pawl 77, which engages with the ratchet-wheel 41. It will be noted that the eccentrics 70 71 are arranged in reverse direction, so that when one eccentric is operating the apron the other will be moved backward. In other words, the eccentrics alternately operate on the ratchet-wheels 40 41 to impart motion in a discharging direction to the apron.

It may be necessary under certain conditions to change the speed of the fertilizer discharge, or, in other words, to change the rate of speed of the apron toward discharging position. This is done by changing the relation of the eccentrics 70 and 71 to the shaft 69, so that a throw of the pawls may extend over one tooth of the ratchet-wheels, or over two or three, as may be required. For this purpose the eccentrics are mounted on hubs 78 79, which are rigidly connected to the shaft 69 and eccentric therewith, the said hubs being extended in opposite directions, and on each hub is a spirally-disposed rib 80, designed to engage in a transverse channel formed in its eccentric. Obviously by moving the shaft 69 lengthwise the said hubs will be drawn through the eccentrics, and the spiral ribs will cause a rotary movement of the eccentrics relative to the shaft, and thus change their position for the purpose before mentioned.

As a means for moving the shaft from the driver's seat a rod 81 extends rearward form a lever 82, arranged at the forward end of the machine-body, said rod 81 being pivoted to a fixed part at the under side of the body, and having a forked end 83 for engaging between collars on the shaft 69. The lever 82 is held as adjusted by means of a pawl 84, carried by the lever engaging with a segment-rack 85. This lever is also designed not only to regulate the speed of discharge, but also to operate means for regulating the width of fertilizer-rows disposed upon the ground, as will be hereinafter described.

Arranged forward of the breaking device 58 and designed to swing vertically is a rake, comprising a cross-bar 86, having depending teeth 87, and extended rearward from the bar 86 are arms 88, which are mounted on cranks 89, having bearings in side portions of the body. From these cranks rods 90 extend forward at opposite sides of the body and engage crank-arms 91, mounted on a shaft 92, from which a foot-bar 93 extends downward within convenient reach of a driver's foot, so that by downward pressure the shaft 92 may be rotated to raise the rake. It will be noted that this rake is to be in its lowered position when loading fertilizer into the body, thus preventing the fertilizer from coming into contact at first with the breaking device. The rake is held yieldingly downward by means of springs 94, connected at one end to the body and at the opposite end to fingers 95, extended outward from the ends of the bar 86.

By the operation of the shaft 92 it is designed to shift the friction member 56 into engagement with the friction member 55, thus locking the sprocket-wheel 53 in rotary connection with the axle or shaft 54, this interlocking of the clutch members being substantially coincident with the raising of the rake, and to thus operate the clutch member or section a rod 96 extends rearward from the arm 91 at the adjacent end of the shaft 92 and connects with a shifting lever 97, pivoted on a stud 98 and having fingers 99, provided with pins for engaging in an annular channel of the hub 100, to which the clutch member 56 is rigidly attached. Of course when the foot-pressure is released from the part 93 the rake will move downward and the clutch members disengage; but this only takes place when moving the empty machine or in drawing it to a place where the fertilizer is to be used. A hook-latch 93ª is provided to hold the foot-bar 93 in position while unloading.

I will now describe the means for moving the breaking device into gear and at the same time placing the ratchet-teeth 40 and 41 in gear for operating the endless apron, this means also comprising devices for automatically changing the parts, so that a reverse movement is given to the apron. Arranged at the forward end of the body within convenient reach of the driver is a lever 101, to which the front end of a rock-shaft 102 is attached, the said rock-shaft passing along one side of the machine-body. From the rear end of this rock-shaft 102 a shifting arm 103 projects downward and has a forked end provided with pins engaging in an annular channel on the hub portion 104 of the clutch member 45, and extended upward from said shaft 102 is a shifting arm 105 for the clutch member 63. On the shaft 106, carrying the sprocket-wheel 25, is a worm 107, engaging with a worm-segment 108, mounted to swing on the forward portion of the body. This segment 108 has a link connection 109 with a vertical sliding releasing-bar 110, designed to engage when in lowermost position with a hook-shaped keeper 111, designed to engage with a downwardly-extended portion of the lever 101, the upper edge of the hook-shaped end of the keeper being beveled upward and inward, and the keeper is held yieldingly upward by means of a spring 112. The upper end of the sliding bar 110 is designed by engaging with a hook-latch 113 to lift it from connection with a lug 114 on the lever 101. This part 113 is held yieldingly downward or moved downward by means of a spring 115 engaging with its upper side.

Secured to the lever 101, near its connection with the rock-shaft 102, is a bow-spring, the inwardly-curved upper portion 116 of which is for engagement with an outwardly-extended pin 117 on the upper portion of the sliding bar 110, and a similar pin 118 on the lower end of the sliding bar is for the purpose of engaging with the inwardly-curved portion 119 of the bow-spring.

At the upper end of the lever 101 is a dog 120 for engaging in one of the shoulders 121 122 123 formed on a fixed bar 124. When the dog 120 is in engagement with the shoulder 123, the lever will be in neutral position—that is, the parts operated by the lever will be out of engagement, so that no motion will be imparted to the apron or to the breaking device. When the parts are operating to discharge fertilizer, the dog will be in engagement with the shoulder 121, and after the discharge the lever will be automatically shifted to engage the dog 120 with the shoulder 122. Then a reverse movement of the apron will take place. To make this clear, it may be stated that while the lever 101 is shifted by the driver to the position indicated in Fig. 9 the parts will be in position to cause movements of the discharge-apron, and also movements of the breaking device, as the clutches will be engaged, as indicated in Fig. 6. As the shaft 106 rotates the worm 107 thereon will impart slow motion to the segment 108, which will, through the medium of the link 109, move the sliding bar 110 downward, and when the pin 118 at the lower end of said bar engages with the portion 119 of the spring it will force said spring portion toward the lever, and when the bar 110 engages with the latch-hook 111 it will force the same out of engagement with the lever 101, so that the pressure of the spring portion 119 against the pin 118 will quickly swing the lever inward until the dog 120 engages with the shoulder 122 and the hook 113 engages the lug 114. At this time the clutch member 43 will be disengaged from the clutch member 42, and therefore no motion will be imparted from the eccentrics to the ratchet-wheels 40 41. The reverse rocking of the shaft 102 through its inward movement of the lever 101 of course will move the clutch-section 63 out of engagement with the loose clutch-section 62, and thus the breaking device will come to a standstill, as will also the eccentrics, which are driven, as before stated, from the breaking device. As the clutch-section 43 is disengaged from the section 42 the clutch-sections 45 and 46 will be placed in connection, and therefore through the chain of gearing as the machine moves forward the shaft 38 will be moved in a direction to move the apron back into the body of the machine. Of course when unloading the abutment 33 will force the load along through the body. All the friction devices may be thrown out of gear, as before mentioned, by placing the lever 101 in its intermediate position.

I will now describe the means heretofore mentioned, designed to be attached to the machine when it is desired to discharge different widths of rows or drills, the same being controlled by the lever which changes the speed of the apron movement. This device consists of a casing 129, open at its front, and having a portion 130 projecting over the top of the body. The casing is held in place by means of bars 131 attached to the casing and engaging in keepers 132 on the sideboards of the body, and it is further held by means of hasps 133, engaging with staples 134, the hasps being held in place by pins 135.

Extended downward from the bottom of the casing with its upper end adjacent to the lower portion of the machine-body is a front board 136, which forms the front wall of two hoppers or discharge-spouts, which are indicated in Fig. 12 at 137 and 138. The side wall of the hopper 137 is formed by an outer swinging board 139, while the inner wall is formed by a swinging board 140. A similar swinging board 141 forms the outer wall of the hopper 138, and a swinging board 142 forms the inner wall thereof. The side walls of each hopper are designed to be swung toward and from each other by a movement of the lever 82 by a means which will now be explained.

The outer side wall 139 of the hopper 137 is connected to the inner side wall 142 of the hopper 138 by a bar 143, and the walls 140 and 141 are connected by a bar 144. These bars have adjustable connection with said swinging side walls, as each bar is provided at its ends with a plurality of holes for receiving the fastening or pivot pins, as clearly indicated in Fig. 12. Mounted to swing on the rear portion of the casing 129 are levers 145 146, the lower end of the lever 145 having pivotal connection with the bar 143, while the lower end of the lever 146 has pivotal connection with the bar 144. On the upper end of the lever 145 a link 147 extends upward, and a similar link 148 extends upward from the lever 146, these two links 147 and 148 being pivotally connected together, as at 149. Connecting with this pivot 149 is a lever 150, mounted to swing on the rear board of the casing, and the opposite end of the lever has a pin 151 engaging in a slot formed in an arm 152, extended inward from the shaft 153, and the forward end of this shaft 153 is provided with an arm 154, connected to the lever 82 by means of a link 155. Obviously by moving the lever 82 to rock the shaft in one direction the meeting ends of the links 147 148 will be forced downward, rocking the levers 145 and 146 to move the swinging side-boards toward each other, thus reducing the outlet or width of rows. By a reverse movement the said swinging side boards will be moved apart.

Having thus described my invention, I claim as new and desire to secure by Letters Patent—

1. A fertilizer-spreader comprising a wheel-mounted body, an apron mounted to reciprocate therein and forming the bottom thereof, means for moving said apron in its discharging direction, means for moving the apron in its reverse direction, both of said means being actuated from forward movement of the spreader, means for changing the speed of the discharge movement, a casing adapted to be attached to the discharge end of the body, hoppers extended downward from said casing, the side boards of said hoppers being mounted to swing toward and from each other, and devices actuated by means for changing the speed of the apron to adjust the distance between the side boards of the hoppers.

2. In a fertilizer-spreader, a wheel-mounted body, an apron mounted to reciprocate therein and forming the bottom thereof, an endless chain to which said apron is attached, a sprocket-wheel by which said endless chain is driven, ratchet-wheels mounted on the shaft of said sprocket-wheel, a longitudinally-movable shaft, eccentrics on said shaft, eccentric-rods extended from the eccentrics, pawls on the rods for engaging with the ratchet-teeth, and means operated by longitudinal movements of the eccentric-carrying shaft to change the rotary relation of said eccentrics to the shaft.

3. In a fertilizer-spreader, a wheel-mounted body, an apron arranged to reciprocate therein and forming the bottom thereof, an endless chain on which said apron is mounted, a sprocket-shaft, a sprocket on said shaft and operating to drive said chain, a sleeve loosely mounted on the sprocket-carrying shaft, means for causing said sleeve to rotate with the shaft, ratchet-wheels on said sleeve, a longitudinally-movable shaft, hubs eccentrically mounted on said shaft and extended in opposite directions, spirally-disposed ribs on said hubs, eccentrics mounted on said hubs and having interior channels for receiving said ribs, eccentric-rods extended from the eccentrics, arms mounted to swing on said sleeve with which said rods engage, and pawls carried by the arms for operating the ratchet-wheels.

4. A fertilizer-spreader comprising a wheel-mounted body, an apron arranged to reciprocate therein and forming the bottom thereof, a rotary breaker arranged over the outlet portion of the apron, a driving-gear for said breaker, a clutch arranged in said gear, a driving-gear for the apron and having a clutch mechanism, a rock-shaft having connection with members of the clutches in each of said gears, a lever for the forward end of the machine, and with which said rocking shaft connects, a sliding bar, locking-latches for engaging with said lever, a bowed spring attached to the lever, pins on the sliding bar for engaging with said spring, the said sliding bar also being adapted for engagement with the locking-latches to release the same from the levers, and a gear mechanism for moving the sliding bar in one direction.

5. In a machine of the character described, a drill sowing attachment comprising a casing, a front board extended downward from the casing, outer swinging side boards extended downward on said front board, inner swinging side boards also extending downward, rod connections between the outer boards and the inner boards whereby the side boards of a pair are moved toward and from each other, and means for causing the movements of said bars.

In testimony whereof I have signed my name to this specification in the presence of two subscribing witnesses.

JOHN O. LINDEN.

Witnesses:
GEO. E. PADDOCK,
A. PETTY.